(12) United States Patent
Bunce et al.

(10) Patent No.: US 6,836,808 B2
(45) Date of Patent: Dec. 28, 2004

(54) PIPELINED PACKET PROCESSING

(75) Inventors: Robert Michael Bunce, Hopewell Junction, NY (US); Christos John Georgiou, Scarsdale, NY (US); Valentina Salapura, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 09/683,863

(22) Filed: Feb. 25, 2002

(65) Prior Publication Data

US 2003/0163589 A1 Aug. 28, 2003

(51) Int. Cl.[7] .............................................. G06F 3/00
(52) U.S. Cl. ............................ 710/20; 710/21; 710/22; 709/232; 709/248; 709/25
(58) Field of Search ................................. 709/232, 248, 709/250; 710/20–22

(56) References Cited

U.S. PATENT DOCUMENTS

| | | | |
|---|---|---|---|
| 4,837,676 A | 6/1989 | Rosman | |
| 5,235,595 A | 8/1993 | O'Dowd | |
| 5,634,015 A | 5/1997 | Chang et al. | |
| 5,860,019 A | 1/1999 | Yumoto | |
| 5,938,736 A | 8/1999 | Muller et al. | |
| 6,147,996 A | 11/2000 | Laor et al. | |
| 6,173,333 B1 | 1/2001 | Jolitz et al. | |
| 6,178,488 B1 | 1/2001 | Manning | |
| 6,665,755 B2 * | 12/2003 | Modelski et al. | 710/100 |
| 2002/0054594 A1 * | 5/2002 | Hoof et al. | 370/389 |
| 2002/0120828 A1 * | 8/2002 | Modelski et al. | 712/200 |
| 2003/0041163 A1 * | 2/2003 | Rhoades et al. | 709/232 |

* cited by examiner

*Primary Examiner*—Nabil El-Hady
(74) *Attorney, Agent, or Firm*—Richard A. Henkler; Dillon & Yudell LLP

(57) ABSTRACT

A method and system for increasing the efficiency of packet processing within a packet protocol handler. In accordance with the method of the present invention packet processing tasks are performed on multiple processors or threads concurrently and in a pipelined fashion. Subsequent protocol packet processing tasks for processing a single packet are performed on multiple processors or threads, acting as stages of a pipeline. The assignment of tasks to processors or threads is performed dynamically, by checking the availability of a processor or thread in the subsequent pipeline stage. The availability determination includes determining the available capacity of the input work queue associated with each processor or thread. If the subsequent pipeline stage is overloaded, the task is assigned to another processor or thread that is not overloaded.

14 Claims, 7 Drawing Sheets

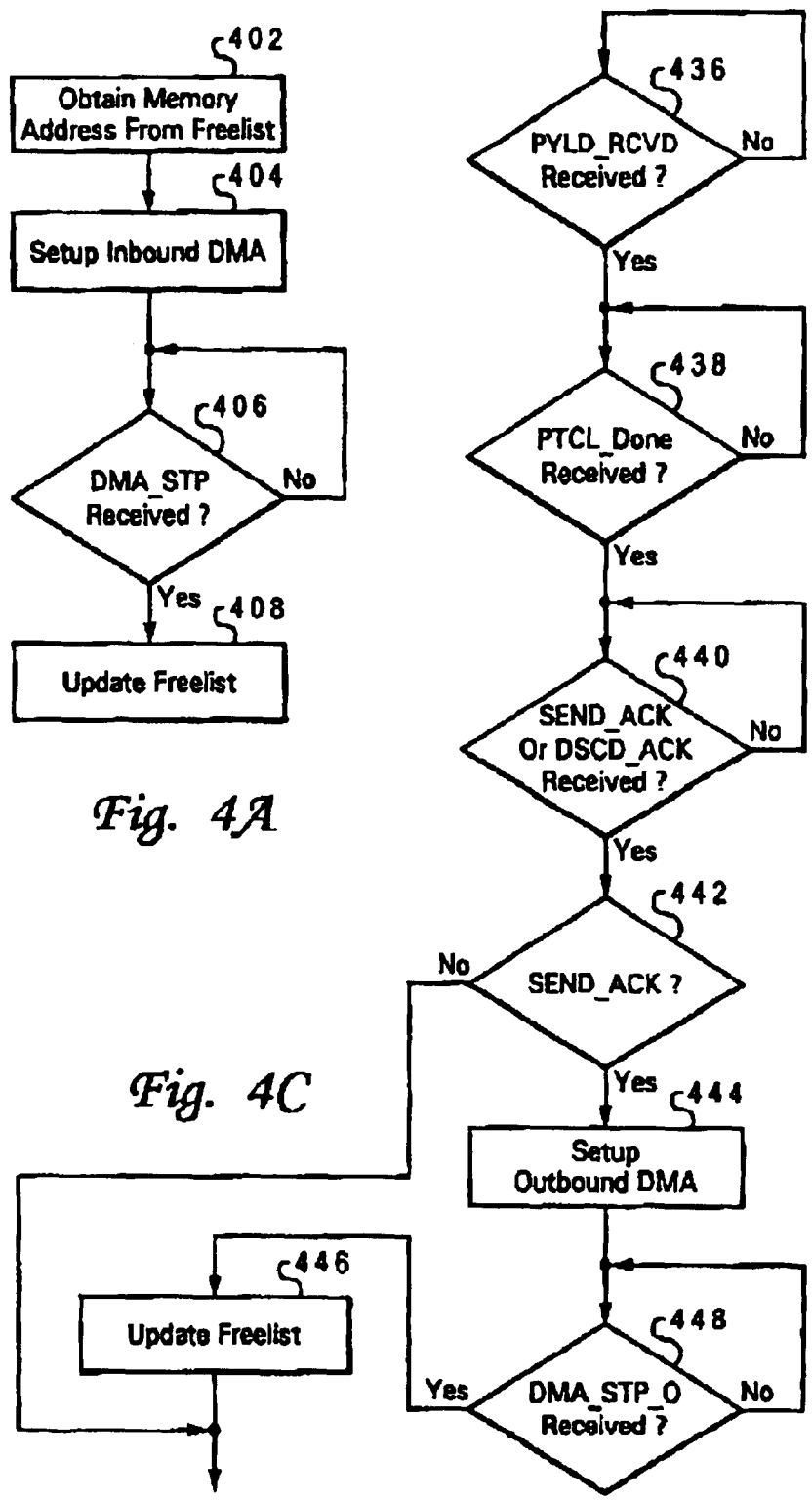

PIPELINED PACKET PROCESSING

BACKGROUND OF THE INVENTION

1. Technical Field

The present invention relates in general to processing of packetized data, and in particular, to a method and system for pipelining particular packet processing functions within a packet processing node.

2. Description of the Related Art

A Fibre Channel is a data transfer architecture developed by a consortium of computer and mass storage device manufacturers and is currently a standard promulgated by the American National Standards Institute (ANSI). Fibre Channel is a high-speed networking technology used to build storage area networks (SANs). Although Fibre Channel can be utilized as a general-purpose network carrying Asynchronous Transfer Mode (ATM), Internet Protocol (IP), and other protocols, it has been primarily used for transporting Small Computer System Interface (SCSI) traffic from servers to disk arrays.

Fibre Channel is designed for new mass storage devices and other peripheral devices that require very high bandwidth. Using optical fiber to connect devices, Fibre Channel supports full-duplex data transfer rates of 2 GB/s. Fibre Channel transmission is performed serially over fiber optic links, and may eventually replace SCSI for high-performance storage systems.

There are two primary sources of latency on any packet-based network such as Fibre Channel networks: link propagation latency due to link length and node latency. The goal of the present invention is to reduce node latency with a corresponding increase in Fibre Channel throughput. To increase end-to-end Fibre Channel throughput, there exists a need to provide a method and system that pipeline protocol handler tasks. The present invention addresses such a need by providing a packet processing system applicable within packet protocol handlers that efficiently pipelines packet processing tasks and queueing algorithms to improve overall network transmission efficiency.

BRIEF SUMMARY OF THE INVENTION

A method and system for increasing the efficiency of packet processing within a packet protocol handler are disclosed herein. In accordance with the method of the present invention packet processing tasks are performed on multiple processors or threads concurrently and in a pipelined fashion. Subsequent protocol packet processing tasks for processing a single packet are performed on multiple processors or threads, acting as stages of a pipeline. The assignment of tasks to processors or threads is performed dynamically, by checking the availability of a processor or thread in the subsequent pipeline stage. The availability determination includes determining the available capacity of the input work queue associated with each processor or thread. If the subsequent pipeline stage is overloaded, the task is assigned to another processor or thread that is not overloaded. Such dynamic allocation of processors or threads to tasks within an adjustable processing pipeline maximizes efficient processing resource allocation and reduces pipeline imbalance, ensuring a flexible solution and maximal throughput in packet processing.

All objects, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4A–C are flow diagrams illustrating three dynamically synchronized pipeline stages applicable within the pipelined packet processing shown in FIG. 3.

DETAILED DESCRIPTION OF THE INVENTION

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

Figure 1:
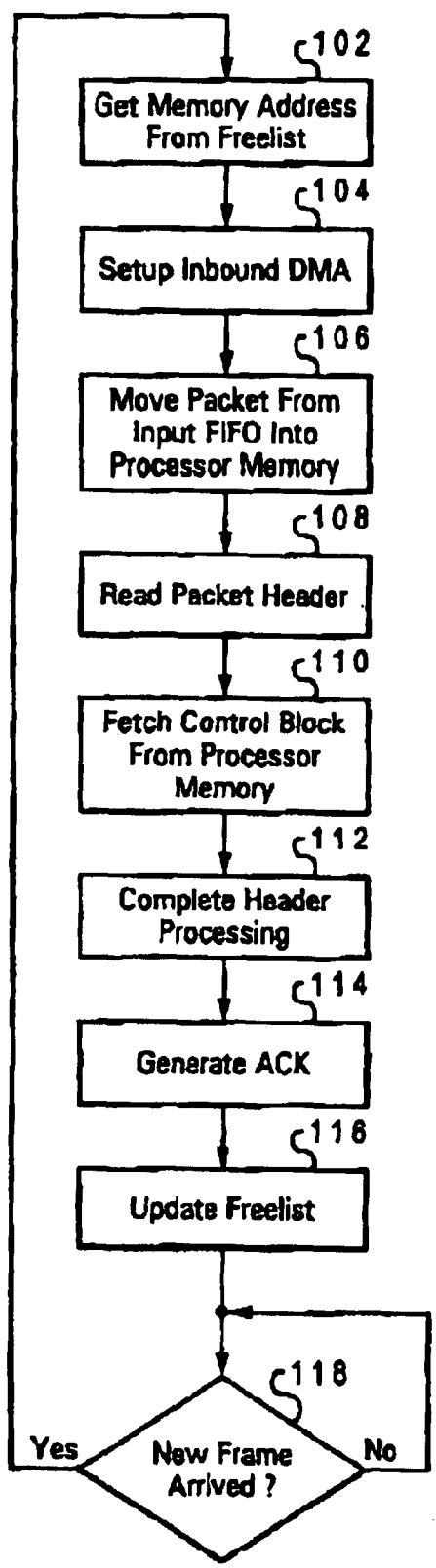
FIG. 1 is a flow diagram depicting a packet processing and queuing algorithm performed by a conventional packet protocol handler.

With reference now to FIG. 1, there is illustrated a flow chart depicting a packet processing and queuing algorithm performed by a conventional packet protocol handler. The enqueuing process begins within the protocol handler, as shown at steps 118 and 102, with a memory address of available memory area being obtained to store the next arriving packet. In a preferred embodiment, the available memory area is arranged as a linked list of free memory buffers with a freelist of available resident memory locations, but it is obvious to one skilled in the art that the available memory can be arranged in any other way without deviated from the scope of the present invention. The enqueuing process continues with the setup of an inbound direct memory access (DMA) by control logic associated with an inbound first-in-first-out (FIFO) buffer as depicted at step 104. Next, as illustrated at steps 106, a DMA transfer is initiated to transfer the incoming packet from the inbound FIFO buffer into the particular memory location determined at step 102 within protocol handler's host processor memory. Following an interrupt of a processing thread by the FIFO control logic, the processing thread examines the control information in the packet header as depicted at step 108.

Subsequent to reading the header control information, the processing thread fetches a control block from system memory based on the content of the packet header (step 110). Header processing is completed utilizing the fetched control block (step 112), and when complete, an acknowledgment signal (ACK) is generated if required as illustrated at step 114. Finally, the freelist is updated to that it points to the next empty memory block as the head of the freelist as depicted at step 116. Step 116 may further include adding currently unutilized memory blocks to the tail of the freelist.

Figure 2A:
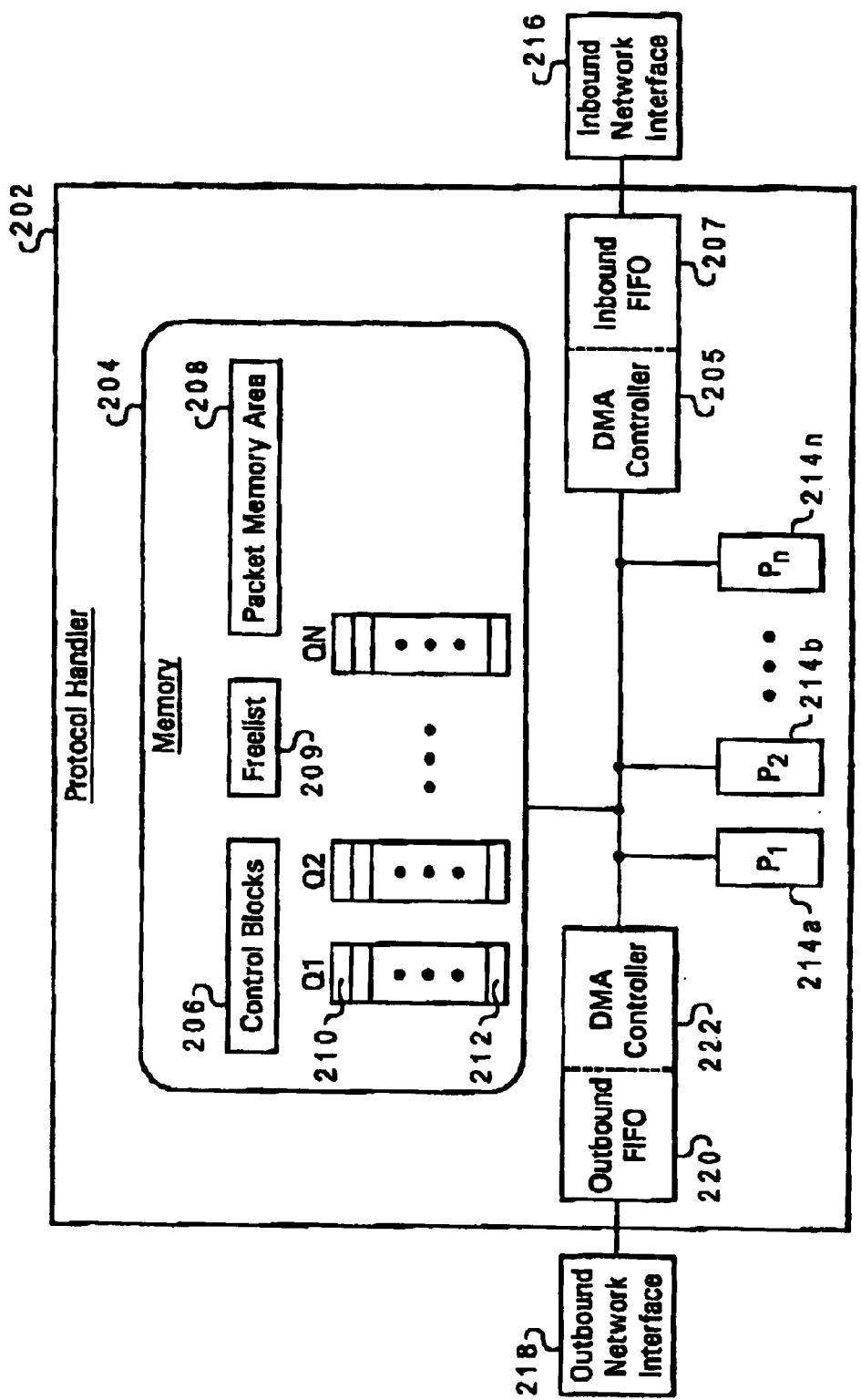
FIG. 2A illustrates a protocol handler system in which pipelined packet processing may be implemented in accordance with a preferred embodiment of the present invention.

As explained with reference to FIGS. 2 through 5, the present invention provides for pipelined processing of packet processing tasks including preparation of an acknowledgment signal, fetching of control blocks, and updating the memory allocation list (freelist). Referring to FIG. 2, there is illustrated the preferred embodiment of a protocol handler system in which dynamically pipelined packet processing may be implemented in accordance with the current invention. As depicted in FIG. 2, a protocol handler 202, which in the exemplary embodiment is configured as a Fibre Channel protocol handler, includes a memory device 204, an inbound direct memory access (DMA) controller 205, and an inbound first-input-first-output (FIFO) buffer 207 for receiving inbound traffic, an inbound DMA controller 222 and an outbound FIFO buffer 220 for transmitting outbound traffic, and an array of processors or threads 214a–214n.

As explained in further detail with reference to FIGS. 3–5, the array of processors or threads 214a–214n dynamically pipeline packet processing tasks in accordance with the principles set forth herein. As inbound packets are received by protocol handler 202 from a network interface 216, they are buffered in inbound FIFO buffer 207 and subsequently transferred to memory 204 in a packet memory area 208. To perform protocol processing tasks, the required control information from a control block memory area 206 is fetched, and if required in accordance with packet header information, an acknowledgment (ACK) packet is generated utilizing a dedicated protocol processing thread (depicted as Thread2 in FIG. 5) within one of processors 214a–214n. After generating an ACK packet, protocol tasks for sending packets to an outbound network interface 218 are performed if an acknowledgment packet has to be transmitted.

Outbound network interface 218 may or may not share the same network architecture as inbound network interface 216. In the latter case, the protocol conversion tasks are required. Such protocol conversion tasks are performed utilizing dedicated threads within processors 214a–214n in conjunction with outbound DMA controller 222. When packet processing is completed, outbound packets are transmitted from an outbound FIFO buffer 220 to outbound network interface 218.

All protocol processing tasks performed during packet processing are partitioned into task groups, and each task group is pre-assigned to be implemented by one of the processors or threads from a multiprocessor array 214a–214n. In this manner, and as explained in further detail with reference to the following figures, processing of each individual packet is performed in a pipelined fashion utilizing multiple processors. As utilized in the following descriptions, a single processor performing assigned protocol tasks corresponds to a single pipeline stage, and a single work queue (depicted as Q1 to QN in FIG. 2) corresponds to a single pipeline buffer. Although in the preferred embodiment all processors or threads from multiprocessor array 214a–214n have the same processor architecture and can perform any protocol task, it is obvious to one skilled in the art that one or several processors or threads can have specialized architecture tuned toward a particular protocol task (e.g., to calculate a checksum) without deviating from the scope of the present invention.

In a preferred embodiment, work queues Q1–QN are employed to facilitate communication between processors and assignment of tasks to designated processors. Each processor has a designated input work queue, which stores the memory address information for a given packet (i.e. wherein the packet is stored within memory 204), and pointers for protocol processing tasks to be performed with respect to the packet. This logical configuration wherein processors 250, 254 and 258 are pipelined utilizing work queues 252 and 256 is illustrated in FIGS. 2B and 2C, which depict alternate scenarios in which parallel pipeline processing (FIG. 2C) is contrasted with serial pipelined processing (FIG. 2B).

Before processor 250 assigns a protocol processing task to subsequent processor 254, the current available capacity of its input work queue 252 is checked if input work queue is currently overloaded, the task is assigned to another processor having a lower input processing load. In this manner, incoming packets are dynamically assigned for processing to one of the processors from the multiprocessor array comprising processors in accordance with its current available input queue capacity.

Figure 2B:
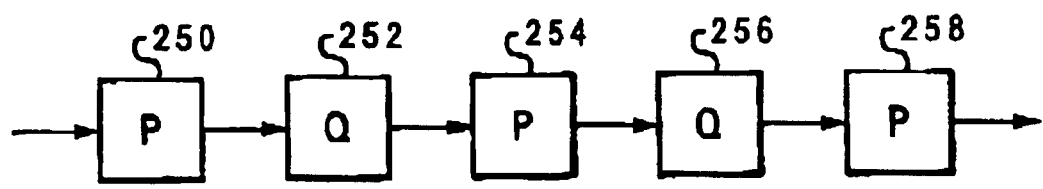
FIG. 2B is a block diagram depicting a serially pipelined protocol processing sequence.

In the serially pipelined processors depicted in FIG. 2B, stages of the pipeline are optimally balanced (typically a strict requirement of pipelined processors) to prevent one stage from becoming a bottleneck within the pipeline. However, an imbalance can occur independently of pipeline stage design when, for example, differing packets require differing processing times in accordance with protocol-specific processing requirements. Such a condition will bring the pipeline out of balance, stalling the stages before and emptying the stages after a particular stage. As illustrated in FIGS. 2C, 3, 4A–4C, and 5 the present invention employs parallel pipeline processing that avoids the need to wait for a particular processor (i.e., pipeline stage), which in accordance with the available capacity of its input queue, may cause a delay in the processing of a given packet.

Figure 2C:
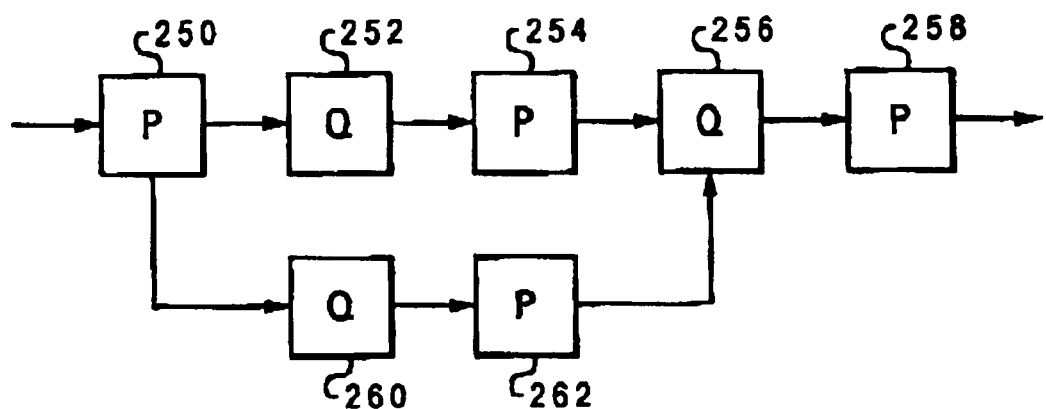
FIG. 2C is a block diagram illustrating a parallel pipelined protocol processing sequence in accordance with the teachings of the present invention.

Implementation of parallel pipelined processors is illustrated in FIG. 2C. After performing a designated protocol processing task within processor 250, input work queue 252 of processor 254 is checked. If the processor 254 is overloaded, i.e., the number of jobs waiting in its queue 252 exceeds a pre-determined threshold, the subsequent protocol processing task is assigned to another processor 262 which has fewer jobs waiting in its input work queue 260.

Figure 3:
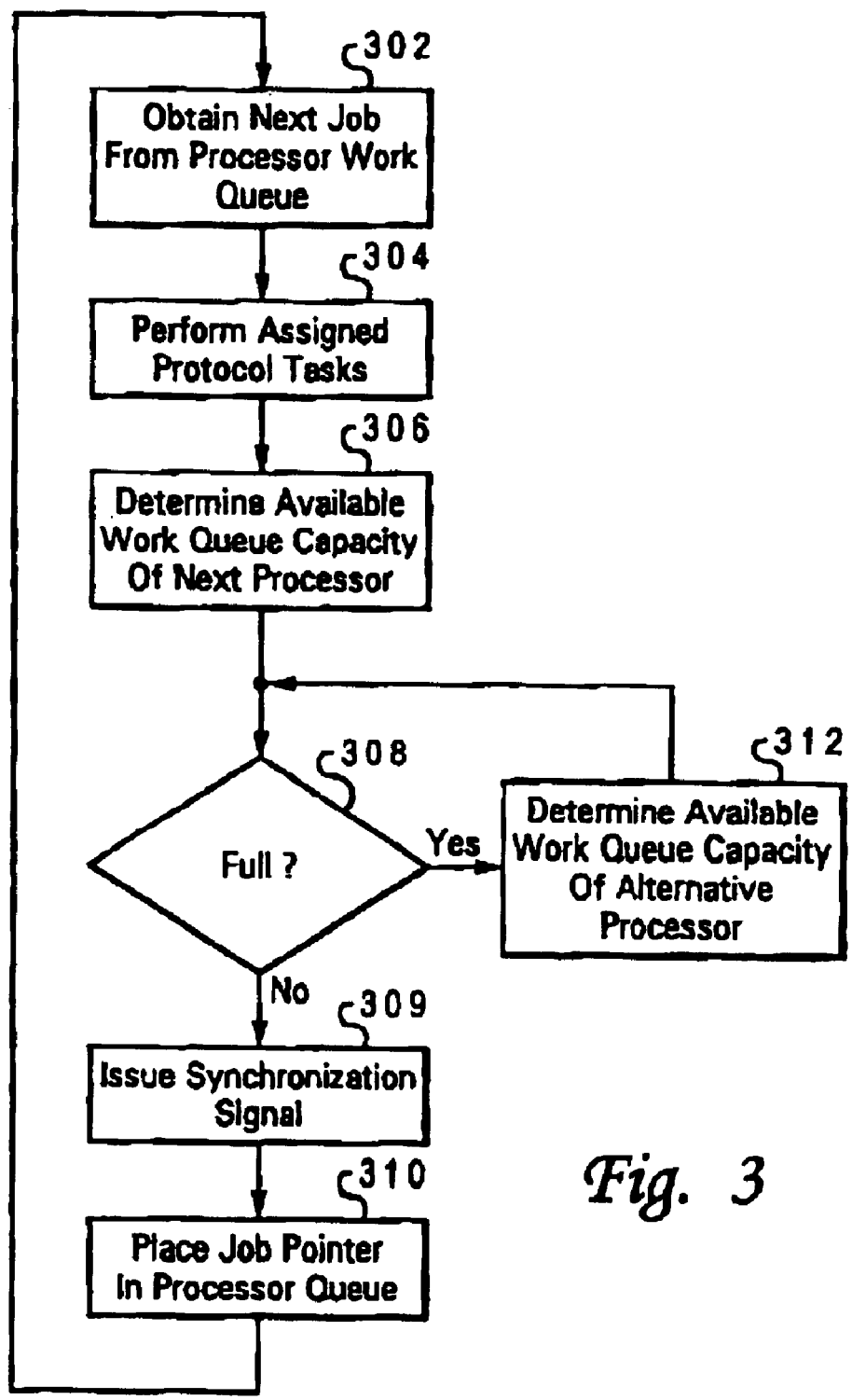
FIG. 3 is a flow diagram depicting steps performed during pipelined packet processing in accordance with a preferred embodiment of the present invention.

With reference to FIG. 3, there is illustrated a flow diagram depicting steps performed by one of processors 214a–214n within multiprocessor protocol handler 202 during pipelined packet processing in accordance with a preferred embodiment of the present invention. As shown at step 302, the process begins with receiving a next job descriptor from the processor's input work queue (i.e. one of work queues Q1–QN). The job descriptor includes packet information and also the requisite protocol processing tasks which are to be performed with respect to the packet. In a preferred embodiment, packet information includes the memory address location of the packet within memory 204, and requisite protocol tasks are pointed to by the address of the program, although other implementations are possible without departing from the spirit and scope of the present invention. To reduce instruction cache conflicts, and in accordance with the embodiments depicted herein, each of processors 214a–214n is pre-designated to perform a particular subset of the protocol tasks.

After obtaining the job descriptor from the input work queue, and as depicted at step 304, protocol tasks assigned to the object processor are performed. Possible protocol tasks include setting up of DMA controllers, managing free lists of available memory locations, obtaining control information from the memory necessary for message exchange tracking, generation of acknowledgment packets (if required by protocol and class of service ), packet validation, packet reordering, message assembling, end-to-end control, data reformatting if implementing conversion of two protocols, generation of frame headers, etc. Several of these tasks are described in detail and illustrated in FIGS. 4A–4C.

After completing the assigned protocol tasks, the processor checks the current availability of the input work queue of the next processor in the pipeline, as depicted at step 306. If, as shown at steps 308, 309, and 310, the input work queue of the next processor is not full (i.e. below a predetermined threshold), the processor may deliver a synchronization signal to the next processor and places the pointer of the job in the work queue of the next processor in the pipeline. The job pointer contains the pointer to the packet memory address and the pointer to the next protocol processing task subset for the packet. In this manner, when none of the processor input work queues are overloaded, each processor performs only its designated protocol processing task subset.

If the input work queue of the next processor is full (i.e. above the predetermined threshold) as determined at step 308, the process continues as depicted at step 312 with the processor checking the input work queue availability of an alternative processor. If an alternative processor is available (i.e. its input work queue is not full), the job pointer is placed in its input work queue as depicted at step 310. As illustrated at steps 308 and 312, if the first alternative processor is also overloaded, the process of finding an non-overloaded processor continues until an available processor is detected and the job pointer is placed in its input work queue.

Referring to FIG. 4A, there is illustrated a flow diagram depicting steps performed by one of processors 214a–214n during pipelined packet processing in performing the protocol task subset illustrated at step 304. Protocol tasks performed on a single processor vary depending on the protocol(s) implemented, the functionality the protocol handler implements (e.g., a router, a switch or an end node), and of the depth of the application pipeline. Protocol tasks are partitioned into specific task subsets, which are then performed at step 304. Here given protocol tasks are only illustrations of possible protocol task partition, and other protocol task partitions and assignments are possible without deviating from the spirit of the present invention.

As shown at step 402, the process begins with a memory address being obtained from a free list 208 of available memory locations when a next packet arrives at protocol handler 202 from inbound network interface 216. After obtaining the memory address from freelist 208, and as depicted at step 404, an inbound DMA transfer is set up. A small number of store operations into register locations (not depicted) within DMA controller 205 is required to set up the inbound DMA process. The inbound DMA set up process includes supplying the address of the memory area in which the incoming packet is stored as a block within memory 204, as well as testing and updating status and control registers (not depicted) within DMA controller 205.

Figure 5:
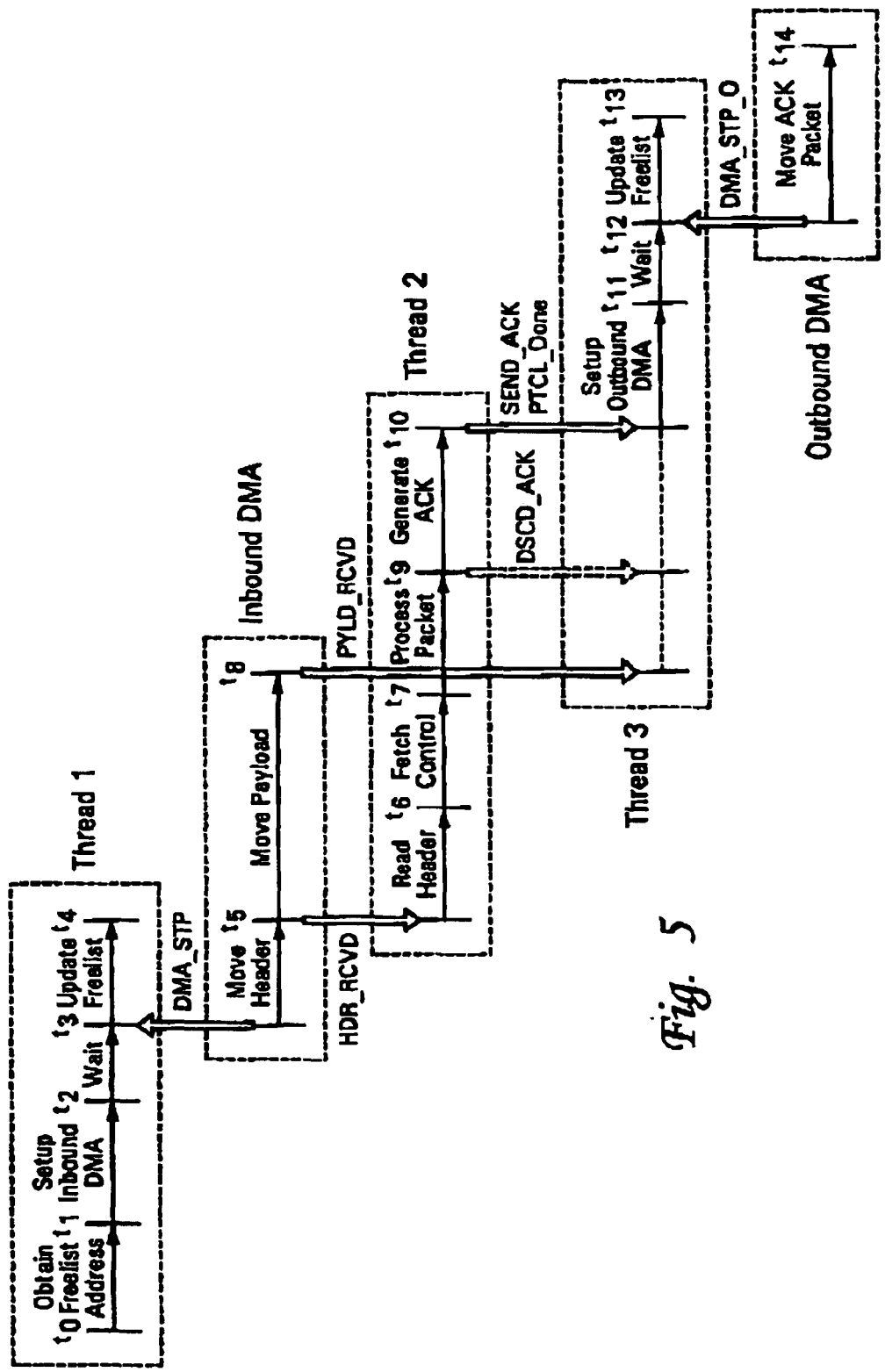
FIG. 5 is a timing diagram illustrating pipelined packet processing in accordance with a preferred embodiment of the present invention.

Upon completion of the inbound DMA set up process, and as depicted in FIG. 5, the processing functionality included within DMA controller 205 issues a pipeline synchronization signal, referred to herein as DMA_STP, to a designated processing thread within the object processor, as depicted at step 406. In response to the issued DMA_STP synchronization signal, a processing thread updates freelist 208 as illustrated at step 408.

In further response to synchronization signal DMA_STP, the step of transferring the received packet from inbound FIFO buffer 207 to the allocated memory location is initiated by inbound FIFO buffer 207. Packet data are transferred from inbound DMA controller 205 to the allocated memory location as follows: n words for the packet header followed by the transfer of 0 to m words of packet payload, wherein m is typically tens to hundreds of times larger than n.

Inbound DMA controller 205 must then determine when the transfer of the packet header has been completed. When it is determined that the header has been transferred, a pipeline synchronization signal, referred to herein as HDR_RCVD, is issued by inbound DMA controller 205. It should be noted that packet header transfer and issuance the corresponding HDR_RCVD synchronization signal will typically occur before the packet payload has been transferred. Following transfer of the packet payload, a pipeline synchronization signal, referred to herein as PYLD_RCVD is issued by inbound DMA controller 205.

Figure 4B:
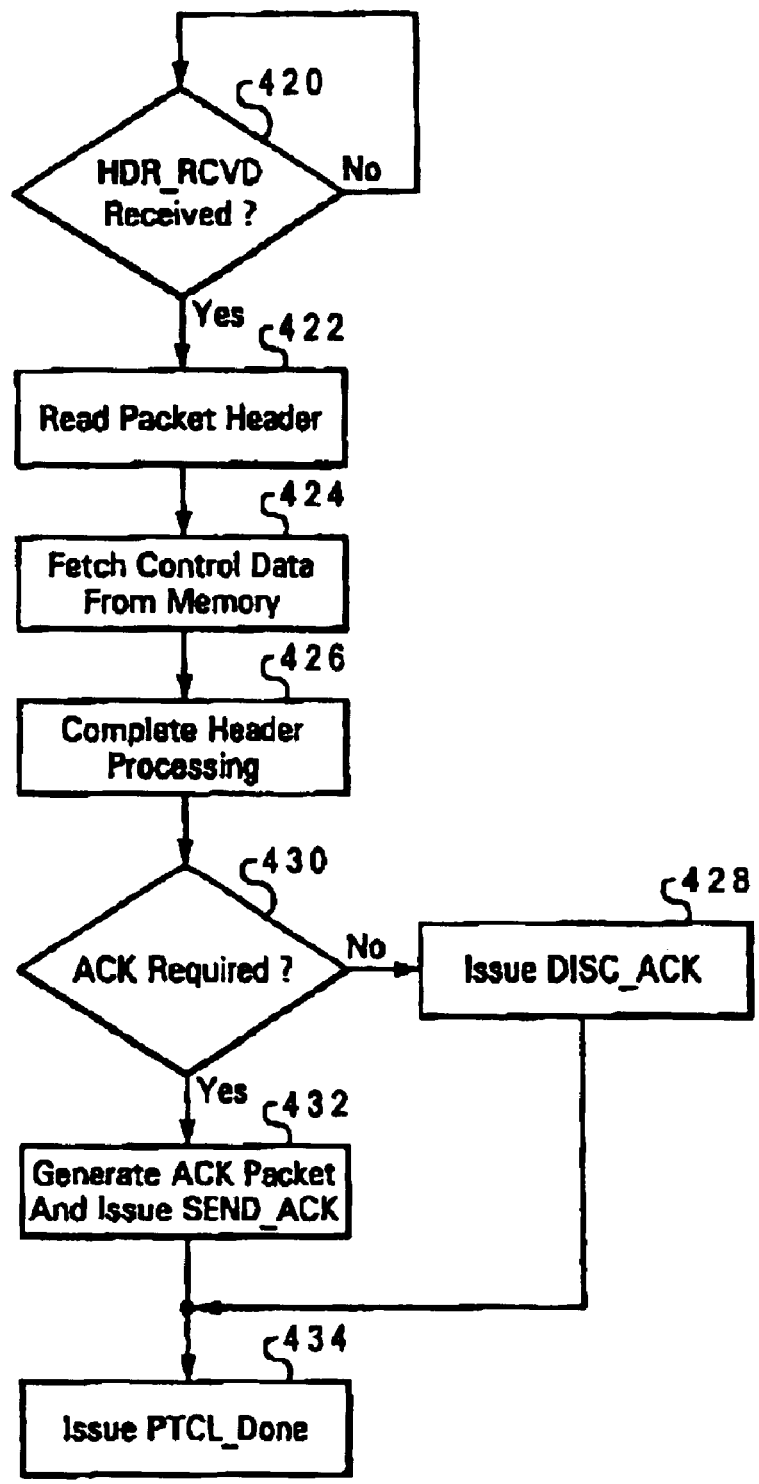

With reference to FIG. 4B, there is illustrated a flow diagram depicting steps performed during execution of an assigned protocol processing task subset during step 304 of FIG. 3. As illustrated at step 420, examination of the packet header (step 422) is not commenced until synchronization signal HDR_RCVD has been issued. In accordance with the packet header information, requisite control block(s) are fetched from control blocks 206 within memory unit 204 (step 424). The retrieved control blocks are utilized for header processing. During this phase, the tasks of packet reordering, data chaining, packet validation, and other required packet processing control tasks are performed. It should be noted that, depending on whether a packet context switch occurs, the control block fetch step may be omitted completely if the currently processed packet belongs to the same exchange and is in sequence with the previously received packet. In a preferred embodiment, several of the most recent control blocks can be held active to reduce context switch costs.

In accordance with the header processing completed as shown at step 426, the pipelined packet processing continues. A determination is made of whether or not, in accordance with the header control information, the packet belongs to a service class requiring an ACK signal reply as depicted at step 430. In response to an affirmative determination at step 430, an ACK packet is generated and a pipeline synchronization signal, referred to herein as SEND_ACK is issued as depicted at step 432. Otherwise, as illustrated at step 428 a DSCD_ACK synchronization signal is generated. At the end, as illustrated at step 434, a pipeline synchronization signal PTCL_DONE is issued.

Referring to FIG. 4C, there is illustrated a flow diagram depicting steps performed during execution of an assigned protocol processing task subset during step 304 of FIG. 3. The process begins as depicted at step 436, with a determination of whether or not the PYLD_RCVD synchronization signal has been received. Once the PYLD_RCVD signal has been received, a further determination of whether or not the PTCL_DONE signal has been received (step 438) and/or which of the SEND_ACK or the DSCD_ACK signals have been issued (step 440). If the SEND_ACK signal was issued, the ACK packet is transmitted to outbound FIFO 220. This is performed by first setting up the outbound DMA controller 222 (step 444). Upon completion of the outbound DMA setup process, the DMA controller 222 issues a pipeline synchronization signal referred to as DMA_STP_O. In response to the issued DMA_STP_O synchronization signal (step 448), the memory free list 208 is updated, as illustrated at step 446.

As described in further detail with reference to FIG. 5, the protocol processing task subsets (processing threads) depicted in each of FIGS. 4A–4C are dynamically allocated within an adjustable processing pipeline that maximizes efficient processing resource allocation and reduces pipeline imbalance resulting from disparate packet processing requirements. Referring to FIG. 5, there is depicted a timing diagram illustrating pipelined packet processing in accordance with the embodiments shown in FIGS. 4A–4C.

As shown in FIG. 5, the pipelined processing explained with reference to FIGS. 4A–4C includes three processing threads, Thread1, Thread2, and Thread3, that operate in conjunction with inbound and outbound DMA controller functions performed by inbound DMA controller 205 and outbound DMA controller 222, respectively. The first of these threads, represented in FIG. 5 as Thread1, begins at time $t_0$, with obtaining a memory address location for a received packet. Subsequent to the memory address retrieval at time $t_1$, the setup of the inbound DMA as described at step 404 is commenced and concludes at time $t_2$. A wait period between times $t_2$ and $t_3$ follows, during which the processor containing Thread1 waits for the DMA_STP synchronization signal to be issued by inbound DMA controller 205.

In response to, and concurrent with the issuance of DMA_STP at time $t_3$, inbound DMA controller 205 initiates the transfer of the packet from inbound FIFO buffer 207 to the allocated memory address. Also in response to the issuance of DMA_STP at time $t_3$, Thread1 updates freelist 208.

When the header portion of the packet has been transferred at time $t_5$, inbound DMA controller 205 issues a HDR_RCVD synchronization signal. The issuance of the HDR_RCVD synchronization signal initiates commencement of an examination of the packet header as explained with reference to step 422 within in a second pipelined thread, Thread2. In accordance with the packet header examination, Thread2 fetches the necessary control block(s) from control blocks 206. It should be noted that the synergistic timing of the DMA_STP and HDR_RCVD synchronization signals results in a temporal overlap between the freelist update in Thread1 and packet header transfer performed by inbound DMA controller 205, and also between the packet payload transfer performed by inbound DMA controller 205 and the header examination and control block fetch (described at step 424) in Thread2.

At time $t_7$, Thread2 commences packet processing, and if in accordance with the inquiry at step 430 of FIG. 4B no ACK packet is required, a DSCD_ACK signal is issued at time $t_9$. If, in accordance with packet information an ACK protocol signal is required, Thread2 generates an ACK packet and delivers a SEND_ACK synchronization signal to Thread3. The processing performed by Thread3, corresponding to the protocol processing step depicted in FIG. 4C is initiated by receipt of a PYLD_RCVD synchronization signal issued by inbound DMA controller 205 at time $t_8$. As depicted in FIG. 5, Thread3 waits for receipt of either a DSCD_ACK/PTCL_DONE or the SEND_ACK/PTCL_DONE synchronization signal from Thread2 and responds accordingly.

In response to receiving the SEND_ACK/PTCL_DONE synchronization signal at time $t_{10}$, Thread3 commences the outbound DMA setup depicted at step 444 of FIG. 4C.

Upon receipt of a DMA_STP_O synchronization signal from outbound DMA controller 222 at time $t_{12}$, Thread3 updates freelist 209 accordingly as illustrated in FIG. 4C at step 446. Packet protocol processing terminates with the delivery of the generated ACK packet (if required) from outbound DMA controller 222 at the same time ($t_{12}$) that DMA_STP_O is issued to Thread3.

Implementation of the pipelined processing depicted in FIGS. 3, 4, and 5 results in several key packet processing functions including preparation of an acknowledgment signal; fetching of control blocks; and updating memory allocation list, to be performed in a temporally overlapping manner, thus decreasing the latency of a given packet processing node. Furthermore, in accordance with an important feature of the present invention, each of synchronization signals DMA_STP, HDR_RCVD, PYLD_RCVD, SEND_ACK, and DMA_STP_O are issued to a particular processor that has been selected in accordance with the methodology illustrated in FIG. 3 whereby a preliminary determination is made of the currently available input work queue capacity of a given processor.

Alternative embodiments and implementations of the present invention are possible. The implementation does not have to make use of synchronization signals raised by processors or threads to other threads or DMA controllers, or other specialized on-chip logic. Instead, pointers to the packet and specification of tasks can be placed into the work queue of the subsequent processor or thread, if this is allowed by the capacity of its work queue, or alternatively, to the work queue of the next identified available processor or thread. Thus, the subsequent processor or thread will check for the next pending task on its work queue once it has finished its current processing. If the subsequent processor or thread is idle, it polls its input work queue regularly to check for the next pending tasks.

A method and system have been disclosed for increasing processing efficiency and throughput of a packet processing apparatus. Software written according to the present invention is to be stored in some form of computer readable medium, such as memory, CD-ROM or transmitted over a network, and executed by a processor. Alternatively, some or all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for pipelining processing of a packet within a packet protocol handler, wherein inbound packet processing is performed within said packet protocol handler utilizing an inbound direct memory access (DMA) controller, said method comprising:

performing a packet processing task with respect to a packet in a first processor said performing a packet processing task comprising initiating a first processing thread within said first processor, wherein said first processing thread obtains a memory address for said packet and sets up an inbound DMA for said received packet utilizing said inbound DMA controller, and performing subsequent packet processing tasks with respect to said packet utilizing subsequent processors or threads, wherein said subsequent processors or threads are dynamically allocated by;

utilizing said inbound DMA controller to move said packet from an inbound buffer into a memory location in accordance with said inbound DMA set up;

responsive to moving the header of said packet, issuing a header received synchronization signal from said inbound DMA controller to said available subsequent processor; and responsive to receiving said header received synchronization signal, initiating a second processing thread within said subsequent available processor, wherein said second processing thread reads the packet header and fetches a control block in accordance with packet header information and processes said packet in accordance with said fetched control block.

2. The method of claim 1, wherein said subsequent processors or threads have associated input work queues, said method further comprising:

determining the available capacity of said input work queues; and dynamically allocating said subsequent packet processing tasks to said subsequent processors or threads in accordance with said determined available capacity of said input work queues.

3. The method of claim 2, wherein said input work queue capacity availability determination includes:

determining whether or not one of said input work queues exceeds a predetermined threshold;

responsive to said one of said input work queues exceeding said predetermined threshold, determining the availability of an alternative one of said subsequent processors or threads; and responsive to said one of said input work queues not exceeding said predetermined threshold, delivering a protocol processing task subset pointer into said one of said input work queues.

4. The method of claim 3, further comprising, responsive to said one of said input work queues not exceeding said predetermined threshold, issuing a pipeline synchronization signal to the subsequent processor or thread associated with said one of said input work queues.

5. The method of claim 3, further comprising:

responsive to one of said input work queues not exceeding said predetermined threshold, placing a task pointer into said one of said input work queues.

6. The method of claim 1, further comprising:

utilizing said inbound DMA controller to move said packet from an inbound DMA buffer into a memory location in accordance with said inbound DMA set up; and responsive to moving said packet, placing the pointer to the memory location where said packet resides to the input work queue of said first processor or thread.

7. The method of claim 1, wherein said processing said packet comprises:

responsive to determining that an acknowledgment signal is required;

generating an acknowledgment packet; and issuing an acknowledgment synchronization signal to a third processing thread within a next available processor; and responsive to receipt of said acknowledgment synchronization signal, performing an outbound direct memory access within said third processing thread.

8. A system for pipelining processing of a packet within a packet protocol handler, wherein inbound packet processing is performed within said packet protocol handler utilizing an inbound direct memory access (DMA) controller, said system comprising:

processing means for performing a packet processing task with respect to a packet in a first processor, said processing means for performing a packet processing task comprising processing means for initiating a first processing thread within said first processor, wherein said first processing thread obtains a memory address for said packet and sets un an inbound DMA for said received packet utilizing said inbound DMA controller; and processing means for performing subsequent packet processing tasks with respect to said packet utilizing subsequent processors or threads, wherein said subsequent processors or threads are dynamically allocated by;

processing means within said inbound DMA controller for moving said packet from an inbound buffer into a memory location in accordance with said inbound DMA set up;

processing means responsive to moving the header of said packet for issuing a header received synchronization signal from said inbound DMA controller to said available subsequent processor; and processing means responsive to receiving said header received synchronization signal for initiating a second processing thread within said subsequent available processor, wherein said second processing thread reads the packet header and fetches a control block in accordance with packet header information and processes said packet in accordance with said fetched control block.

9. The system of claim 8, wherein said subsequent processors or threads have associated input work queues, said system further comprising:

processing means for determining the available capacity of said input work queues; and processing means for dynamically allocating said subsequent packet processing tasks to said subsequent processors or threads in accordance with said determined available capacity of said input work queues.

10. The system of claim 9, wherein said processing means for determining the available capacity of said input work queue includes:

processing means for determining whether or not one of said input work queues exceeds a predetermined threshold;

processing means responsive to said one of said input work queues exceeding said predetermined threshold for determining the availability of an alternative one of said subsequent processors or threads; and processing means responsive to said one of said input work queues not exceeding said predetermined threshold for delivering a protocol processing task subset pointer into said one of said input work queues.

11. The system of claim 10, further comprising, processing means responsive to said one of said input work queues not exceeding said predetermined threshold for issuing a pipeline synchronization signal to the subsequent processor or thread associated with said one of said input work queues.

12. The system of claim 10, further comprising:

processing means responsive to one of said input work queues not exceeding said predetermined threshold for placing a task pointer into said one of said input work queues.

13. The system of claim 10, further comprising:

processing means within said inbound DMA controller for moving said packet from an inbound DMA buffer into a memory location in accordance with said inbound DMA set up; and processing means responsive to moving said packet for placing the pointer to the memory location where said packet resides to the input work queue of said first processor or thread.

14. The system of claim 8, wherein said processing means for processing said packet comprises:

processing means responsive to determining that an acknowledgment signal is required for:
 generating an acknowledgment packet; and
 issuing an acknowledgment synchronization signal to a third processing thread within a next available processor; and processing means responsive to receipt of said acknowledgment synchronization signal for performing an outbound direct memory access within said third processing thread.

* * * * *

UNITED STATES PATENT AND TRADEMARK OFFICE
CERTIFICATE OF CORRECTION

PATENT NO.    : 6,836,808 B2
DATED         : December 28, 2004
INVENTOR(S)   : Bunce et al.

It is certified that error appears in the above-identified patent and that said Letters Patent is hereby corrected as shown below:

Column 4,
Line 22, delete "checked if" and insert -- checked. If --.

Column 10,
Line 12, delete "un" and insert -- up --.

Column 11,
Line 11, delete "8" and insert -- 10 --.

Signed and Sealed this

Tenth Day of January, 2006

JON W. DUDAS
*Director of the United States Patent and Trademark Office*